(12) United States Patent
Collmer

(10) Patent No.: US 8,875,593 B2
(45) Date of Patent: Nov. 4, 2014

(54) PAINTING ROBOT

(75) Inventor: Andreas Collmer, Vaihingen (DE)

(73) Assignee: Duerr Systems GmbH, Bietigheim-Bissingen (DE)

( * ) Notice: Subject to any disclaimer, the term of this patent is extended or adjusted under 35 U.S.C. 154(b) by 406 days.

(21) Appl. No.: 13/203,816

(22) PCT Filed: Feb. 3, 2010

(86) PCT No.: PCT/EP2010/000634
§ 371 (c)(1),
(2), (4) Date: Aug. 29, 2011

(87) PCT Pub. No.: WO2010/097159
PCT Pub. Date: Sep. 2, 2010

(65) Prior Publication Data
US 2012/0000312 A1    Jan. 5, 2012

(30) Foreign Application Priority Data

Feb. 27, 2009 (DE) .................... 10 2009 010 953

(51) Int. Cl.
| | |
|---|---|
| *B25J 17/02* | (2006.01) |
| *B25J 19/00* | (2006.01) |
| *B05C 5/00* | (2006.01) |
| *B05B 13/04* | (2006.01) |
| *B05B 15/06* | (2006.01) |

(52) U.S. Cl.
CPC .............. *B25J 19/0029* (2013.01); *B05C 5/00* (2013.01); *B05B 13/0431* (2013.01); *B05B 15/066* (2013.01); *Y10S 901/40* (2013.01); *Y10S 901/41* (2013.01); *Y10S 901/43* (2013.01); *Y10S 901/45* (2013.01); *Y10S 414/131* (2013.01)
USPC ................. 74/490.01; 74/490.05; 74/490.06; 901/40; 901/41; 901/43; 901/45; 414/918; 239/690; 239/700; 239/704; 239/708; 118/323; 118/629

(58) Field of Classification Search
CPC .............. B05B 13/0431; B05B 15/066; B25J 19/0029; B05C 5/00
USPC ................. 118/323, 629; 74/490.01–490.06; 901/40, 41, 43, 45; 414/918; 59/78.1; 248/74.1–74.9; 239/690, 700, 704, 708
See application file for complete search history.

(56) References Cited

U.S. PATENT DOCUMENTS 4,705,243 A * 11/1987 Hartmann et al. .............. 248/51
6,293,504 B1 * 9/2001 Hartmann ..................... 248/74.1
(Continued)

FOREIGN PATENT DOCUMENTS

| CN | 1666847 A | 9/2005 |
|---|---|---|
| DE | 3790743 T2 | 1/1989 |

(Continued)

OTHER PUBLICATIONS

International Search Report PCT/EP2010/000634, Dated Jan. 4, 2010.

*Primary Examiner* — Laura Edwards
(74) *Attorney, Agent, or Firm* — Bejin Bieneman PLC

(57) ABSTRACT

A robot, such as a painting robot for painting components such as motor vehicle body components, is disclosed having a plurality of robot elements that are pivotable relative to each other. At least one flexible supply line may run from a proximal robot element to a distal robot element. The supply line may be axially displaceable in the proximal robot element relative to the longitudinal axis of the supply line, so that the supply line can perform an axial compensating motion during a pivot motion of the robot.

21 Claims, 2 Drawing Sheets

(56) References Cited

U.S. PATENT DOCUMENTS

| | | |
|---|---|---|
| 6,811,124 B2 | 11/2004 | Karlinger |
| 2003/0226940 A1 | 12/2003 | Karlinger |
| 2005/0072261 A1 | 4/2005 | Okada et al. |
| 2005/0189333 A1 | 9/2005 | Nakagiri et al. |
| 2005/0199601 A1 | 9/2005 | Inoue et al. |
| 2006/0101937 A1 | 5/2006 | Salomonsson et al. |
| 2006/0294628 A1 | 12/2006 | Iwai et al. |
| 2008/0236484 A1* | 10/2008 | Herre et al. .................. 118/258 |

FOREIGN PATENT DOCUMENTS

| | | |
|---|---|---|
| DE | 69107567 T2 | 10/1995 |
| DE | 19645413 A1 | 10/1997 |
| DE | 19916706 A1 | 10/2000 |
| DE | 20112491 U1 | 10/2001 |
| DE | 20113742 U1 | 11/2001 |
| DE | 10224858 A1 | 1/2004 |
| DE | 60006165 T2 | 7/2004 |
| DE | 69919197 T2 | 8/2005 |
| DE | 102004014209 A1 | 10/2005 |
| DE | 102004028577 A1 | 12/2005 |
| DE | 102004033330 A1 | 2/2006 |
| DE | 20221807 U1 | 1/2008 |
| EP | 1938930 A1 | 7/2008 |
| JP | 59007598 A | 1/1984 |
| JP | 62188384 A | 8/1987 |
| JP | 2003159689 A | 6/2003 |
| JP | 2005-238428 A | 8/2005 |
| JP | 2007-229874 A | 9/2007 |
| JP | 2008-073833 A | 2/2008 |

\* cited by examiner

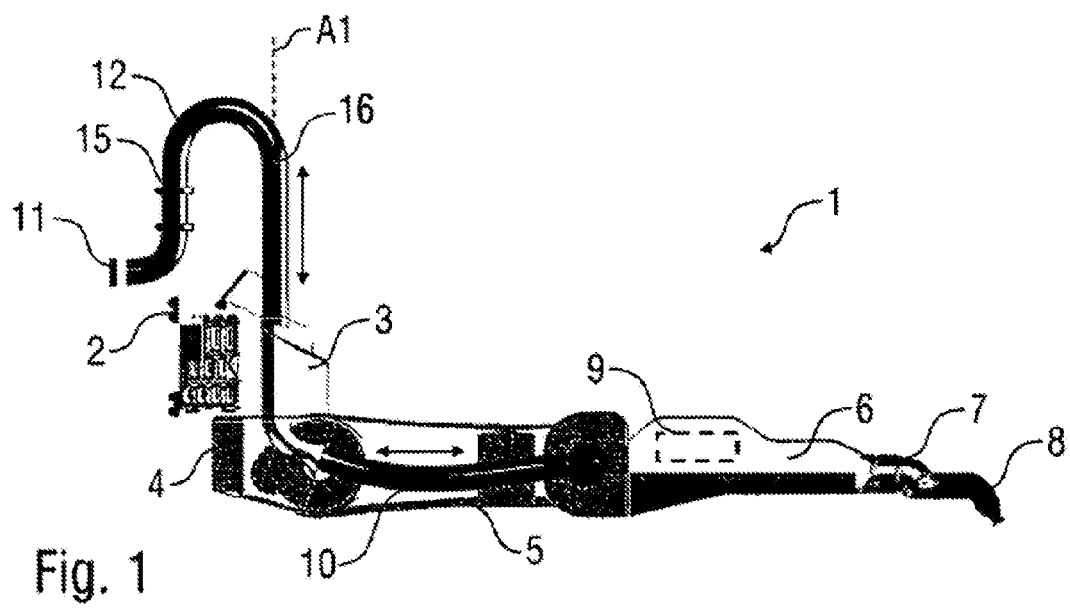

PAINTING ROBOT

BACKGROUND

The present disclosure relates to a robot according to the main claim, for example a painting robot for painting motor vehicle body components.

Conventional painting robots typically may have a plurality of robot elements swivelable and rotatable relative to each other, which are located kinematically one behind the other, and which guide a rotary atomizer as an application device, for example, wherein the rotary atomizer is supplied by a plurality of supply lines, for example with paint, flushing agent, driving air and high voltage power. A problem in this configuration is the guidance of the supply lines in the individual robot elements, since a change in the position of the robot leads to a respective change in the required length of the line. Therefore on the well-known painting robots the supply lines are guided as a bundle by a swivel joint wherein the bundle is fixed kinematically in front of and behind the swivel joint axially by strain reliefs. The length compensation required for a change in the position of the robot is exclusively achieved by a visible compensation loop placed between the strain reliefs.

A disadvantage of the conventional line guidance as described above for a painting robot is first of all the fact that a compensation loop placed between the strain reliefs is needed in order to achieve the length compensation required for a robot movement, whereby the supply line is unnecessarily long which is disadvantageous with regard to costs, weight, losses of paint and the pneumatic control times.

A further disadvantage of the compensation loop needed for the length compensation is the relatively large space needed by the compensation loop which generally projects out over the outer contour of the multi-element robot arm and therefore limits the freedom of movement of the painting robot.

Furthermore the manufacturing costs and the assembly time for the conventional painting robot described above are relatively large since numerous axial strain reliefs are needed for the supply lines and must be assembled in a way which requires much time and costs.

A further disadvantage of the conventional line guidance of the supply lines for a painting robot arises from the fact that the painting robot usually also allows a rotary movement around a substantially vertical rotary axis, wherein the supply line is loaded with torsion. The axial strain relief reduces the free hose length of the supply line on which the arising torsional load must be taken up. Therefore the axial strain reliefs on the conventional line guidance lead to an increase in the loading by torsion so that additional hose lengths must be kept ready to take up the torsional load arising.

There is, furthermore, another disadvantage with the conventional line guidance on painting robots is that the supply lines cannot be guided in a hose guidance plane whereby use of pigable supply hoses is impeded.

It is, furthermore, disadvantageous to have the additional mechanical loading of the supply hoses used and the associated screw connections as well as the increased time and costs required for assembly and disassembly work with regard to hose mounting or hose changing. Furthermore special components are usually needed for the conventional line guidance which is also disadvantageous.

Accordingly, there is a need for a painting robot with a corresponding improved line guidance for the supply lines.

BRIEF DESCRIPTION OF THE FIGURES

FIG. 1 a side view of an exemplary painting robot,
FIG. 2 a plan view of the exemplary painting robot from FIG. 1,
FIG. 3 a perspective view of the exemplary painting robot from FIGS. 1 and 2,
FIG. 4A a schematic representation of a spring rod for axial tensioning of the supply line for the exemplary painting robot according to FIGS. 1-3, as well as,
FIG. 4B a schematic representation of an exemplary spring rod in a deflected state.

DETAILED DESCRIPTION

Figure 3:
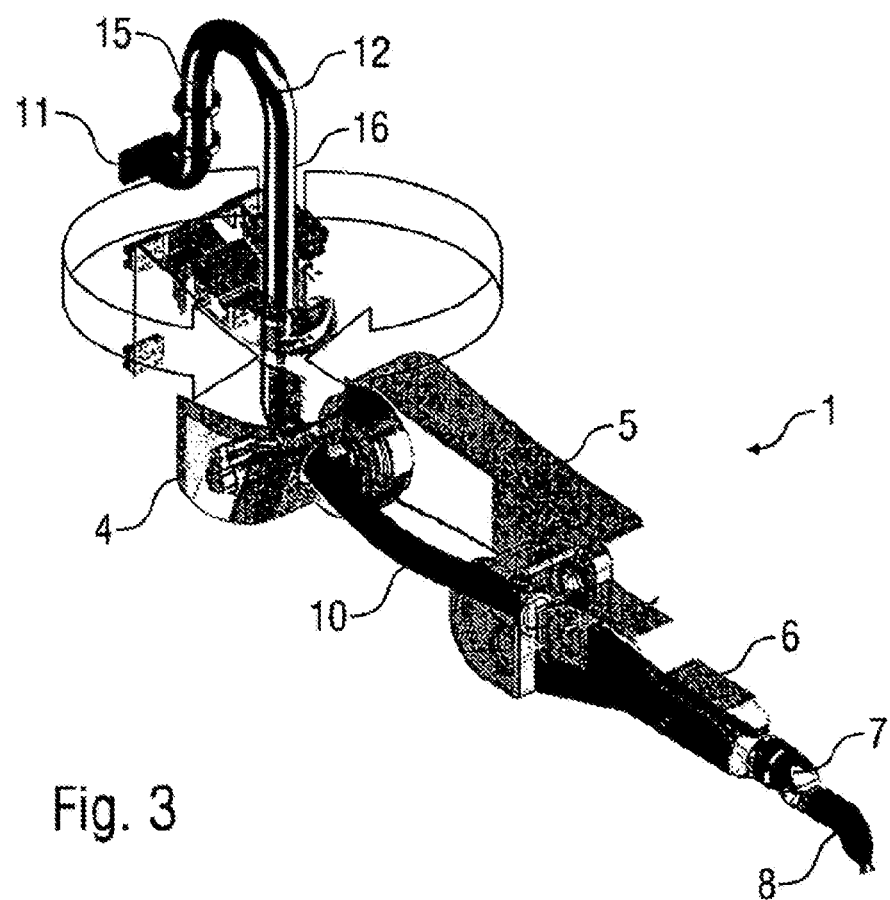

An exemplary robot may comprise a plurality of robot elements (e.g. robot arms) that are pivotable or rotatable relative to each other. An exemplary robot may also comprise at least one bendable supply line which is guided from the proximal robot element (e.g. a fixed or movable mounted robot base) to the distal robot element (e.g. a robot arm). An exemplary robot may also have a supply line in the proximal robot element that can move axially with regard to the longitudinal axis of the supply line so that the supply line can perform a compensating movement during a swiveling motion of the robot.

This is advantageous since the length requirement of the supply line in the robot fluctuates depending on the position of the robot so that the axial compensating movement of the supply line can compensate for the fluctuating length requirement.

In contrast to the conventional painting robots described above the supply line of the robot according to the invention may advantageously not be fixed axially so one can generally dispense with axial stress reliefs. However, the exemplary illustrations are not limited to robots which do not have any axial stress reliefs for the supply line. Rather, the exemplary illustrations also include robots which are provided with an axial stress relief in the distal robot element, for example.

In one exemplary illustration, the robot additionally comprises a mechanical tensioning element which exerts an axial and proximal aligned retracting force on the supply line. If the length requirement of the supply line decreases because of a movement of the robot, the tensioning element pulls back the supply line in a proximal direction. If the length requirement of the supply line increases because of a movement of the robot, the supply line is pulled by the movement of the robot against the pulling back force of the tensioning element in a distal direction.

In another example, the tensioning element is a spring rod as is known from the prior art so that a bending load of the supply line leads to a respective restoring force. Such a spring rod can be made out of spring steel and can surround the supply line on a portion in a spiral form. As an alternative there is also the possibility that the spring rod is located in the supply line. The tensioning element can therefore generally comprise spring elements which can be located relative to the supply line on the inside and/or the outside.

The restoring force of the spring rod initially acts in a radial direction, however the restoring force for an appropriate line guidance is converted into the axially acting restoring force.

In the framework of the exemplary illustrations, other different kinds of tensioning elements can be used instead of a spring rod, such as elastic cable winches, spiral springs or GRP rods which surround the supply line and, on the one hand, engages a housing fixed counter bearing and, on the other hand, a line flange mounted on the supply line so that the spiral spring pushes away the line flange together with the supply line axially from the housing fixed counter bearing.

One further example for a tensioning element which can be used in the framework of the invention are the line guides sold by the company IGUS GmbH under the brand name Triflex®.

It is also possible to use a tensioning element, for example as described in DE 202 21 807 U1.

Therefore the tensioning element can also generate the axial restoring force directly, that is without conversion from a radial restoring force. For example, the tensioning element can be designed for this purpose as a spiral spring which surrounds the supply line on the outside or the inside and which is connected with the wall of the supply line. As a result, an axial elongation of the supply line is connected with a corresponding axial elongation of the spiral spring, whereby the axial restoring force is generated.

Concerning the tensioning element one should also mention that the tensioning element may be arranged stationary relative to the proximal robot element and may generate the restoring force in the proximal robot element.

In another exemplary illustration, the supply line comprises a compensation loop which may be located in the proximal robot element wherein the compensation loop allows the above-mentioned axial compensating movement of the supply line for movement of the robot. The length of the compensation loop may therefore advantageously be at least as great as the maximum fluctuation of the length of the supply line during operation of the robot.

Here, the compensation loop may comprise two line legs wherein the tensioning element in the form of the spring rod can engage on the proximal line leg 15 or on the distal line leg 16 of the compensation loop.

One should furthermore mention the fact that the supply line in some exemplary illustrations may substantially run in a hose guide plane, namely independently of the respective robot position. This has the advantage that the supply line is only subjected to bending in the case of a change in the robot position but not, on the other hand, to torsion, a fact which simplifies laying of pigable hoses.

In some exemplary illustrations, the robot has a first robot element (e.g. robot base) which can optionally mounted stationary or movable on a travel rail which is as such known from the prior art.

Furthermore there may be a second robot element provided which is attached rotatable to the first robot element wherein the rotary axis of the second robot element may be aligned vertically.

The second robot element may be attached rotatable under the first robot element but the second robot element can also alternatively be located above the first robot element or laterally thereof in a rotatable manner.

There may also be a third robot element provided in the form of a robot arm attached pivotable to the second robot element wherein the pivot axis of the third robot element may be aligned horizontally.

A fourth robot element in the form of a robot arm may be attached pivotable to the third robot element wherein also the pivot axis of the fourth robot element may be aligned horizontally.

The fourth robot element may include a distal robot arm which guides a multi-axis robot wrist, e.g., any known multi-axis robot wrist.

The robot wrist may ultimately guides a tool such as an atomizer, e.g., a rotary atomizer. However, the exemplary illustrations also include other types of robots which guide another type of tool such as a nozzle head for application of a seam sealant or an application head for application of a liquid film.

For the above-mentioned structure of the exemplary robots, the supply line can be movable axially in one or more or even all robot elements. Furthermore the supply line may also be in the pivoting or rotating joints between the adjacent robot elements axially movable in order to allow the compensation movement described at the beginning during a change of the robot position.

In the description of the prior art it was mentioned at the beginning that the compensation loop required for length compensation usually projects over the outer contour of the robot arm and therefore limits the freedom of movement of the robot, since a collision of the compensation loop which projects over the outer contour with the motor vehicle body components to be coated or the boundaries of the painting cabin must be avoided in any case. On some exemplary robots, the line guidance may, on the other hand, be designed in such a way that the supply line independently of the robot position in the pivot plane does not project over the outer contour of the respective robot element. This may be achieved in that the mechanical tensioning element applies such a large axial restoring force to the supply line that the supply line is always smoothened independently of the robot position in such a way that the supply line does not project over the outer contour of the respective robot arm.

In some exemplary illustrations, there are three robot elements provided located kinematically one after the other and pivotable relative to each other, wherein the kinematically outer lying robot elements are substantially located in a common pivot plane while the robot element lying kinematically therebetween is located laterally offset relative to pivot plane and therefore leaves space for the supply line. Here, the supply line bridges the intermediate space between the kinematically outer lying robot elements and runs in the intermediate space, e.g., outside the robot element lying kinematically in the middle laterally beside. On the one hand this arrangement offers the advantage that the supply line can run over its whole length in a hose guide plane which simplifies pigability of the supply line. On the other hand it is possible with this type of line guidance to substantially avoid bending of the supply lines.

The term supply line used in the framework of the exemplary illustrations may refer to a hose package which includes a plurality of hose lines wherein the individual hose lines can, for example, transfer driving air for a rotary atomizer, a coating material (e.g. paint), solvent for the coating material, pulsed air and/or a high voltage for electrostatic coating operation of the atomizer. The supply lines can thus include fluidic or electric lines.

In some exemplary illustrations, a robot may have a constructionally integrated colour changer that is attached to or in the distal robot arm, wherein the fluidic supply lines are pigable up to the colour changer.

One should also mention the fact that the exemplary illustrations are not limited to the robot described above as a single device but also includes a complete coating plant which is equipped with at least one such painting robot.

The exemplary illustrations finally also includes a new use of such a robot in a coating plant for coating motor vehicle body components.

FIGS. 1-3 show various views of an exemplary painting robot 1 which can be used, for example, to coat motor vehicle body components in a coating plant.

The painting robot 1 in this case can be mounted over a connecting flange 2 optionally stationary or linearly movable.

The connecting flange 2 may be located here on a robot base 3 wherein the robot base 3 carries a rotatable robot element 4 on its underside which can be rotated relative to the robot base 3 around a vertical rotary axis A1.

A robot arm 5 may be pivotably arranged on the rotatable robot arm 4, wherein the robot arm 5 is pivotable relative to the robot element 4 around a horizontally aligned pivot axis A2 and is designated as "Arm 1" using the usual specialist terminology used in the field of robot engineering.

A distal robot arm 6 may be pivotably mounted on the distal end of the robot arm 5, wherein the distal robot arm 6 is designated as "Arm 2" using the usual specialist terminology used in the field of robot engineering and pivotable relative to the robot arm 5 around a horizontally extending pivot axis A3.

A multi-axis robot wrist 7 may be attached to the distal end of the robot arms 6 wherein the wrist 7 which can position a conventional rotary atomizer 8 in a high mobile fashion.

The rotary atomizer 8 may be supplied here with the desired paint by a colour changer 9 wherein the colour changer 9 is located in the distal robot arm 6 and is therefore relatively close to the rotary atomizer 8, whereby paint changing losses are minimized.

Supply of the rotary atomizer 8 and the colour changer 9 may take place through a supply line 10 in the form of a package of hoses which includes many hose lines for the various media (e.g. paint, flushing agent, driving air, etc.). The supply line 10 starts here from a block clamp 11 and initially creates a compensation loop 12 which allows axial compensatory movement of the supply line 10 in the direction of the arrow if the movement of the robot requires a change in length of the supply line 10.

The supply line 10 may be tensioned here by a mechanical tensioning element in the form of a spring rod 13 (see FIGS. 4A and 4B) wherein the tensioning element 13 exerts an axially and proximally aligned restoring force on the supply line 10. Thus the tensioning element 13 seeks to pull the supply line 10 in the representation shown in FIG. 1 upwards out of the robot base 3. This achieves that the supply line 10 independently of the position of the robot does not project out over the outer contour of the robot arm 5, as is particularly clear to see in the side view in FIG. 1. This is advantageous since in this way the supply line 10 does not limit the freedom of movement of the painting robot 1.

Furthermore it can be seen from FIG. 2 that the supply line 10 may run over its whole length substantially in a hose guidance plane 14. This is advantageous because in this way the supply line 10 is subjected substantially only by bending but not by torsion which is advantageous for the pigability of the supply line 10.

Figure 4A:
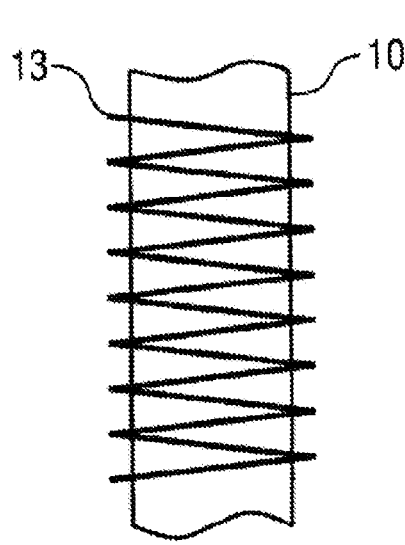
Figure 4B:
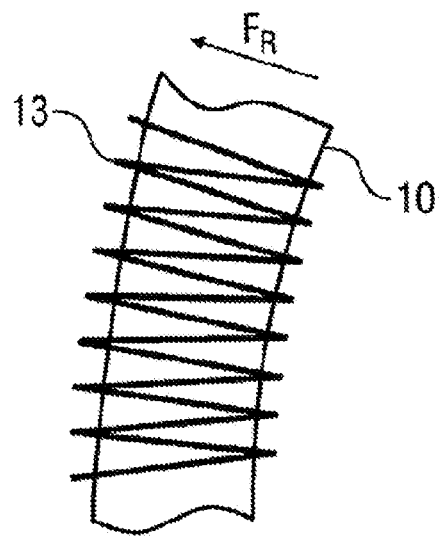

Regarding FIGS. 4A and 4B one should note that the tensioning element 13 can alternatively also be connected with the wall of the supply line 10 so that an axial elongation of the supply line 10 is connected with an axial elongation of the tensioning element 13 of the same size, which leads to a corresponding axial restoring force.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

The invention claimed is:

1. Robot, comprising:
   a plurality of robot elements which are pivotable relative to each other, and
   at least one bendable supply line which is guided from a proximal robot element to a distal robot element, wherein:
   the supply line in the proximal robot element is axially movable with regard to the longitudinal axis of the supply line so that the supply line can perform an axial compensatory movement during a pivoting movement of the robot;
   and further wherein:
   the supply line includes a compensation loop,
   ends of the compensation loop are located on the proximal robot element,
   the compensation loop allows an axial compensatory movement of the supply line during a pivoting movement of the robot; and
   the compensation loop includes two line legs between the ends and free of the proximal robot element, wherein a tensioning element engages on one of a proximal line leg and a distal line leg of the compensation loop to exert a force causing axial movement of the supply line.

2. Robot according to claim 1, wherein
   a) the adjacent robot elements are one of rotatably and pivotably connected with each other by a joint, and
   b) the supply line passes through the joint.

3. Robot according to claim 1, wherein the tensioning element exerts an axially and proximally aligned restoring force on the supply line.

4. Robot according to claim 3, wherein the tensioning element is a spring rod.

5. Robot according to claim 3, wherein the tensioning element is arranged stationary with regard to the proximal robot element.

6. Robot according to claim 3, wherein the tensioning element generates the restoring force in the proximal robot element.

7. Robot according to claim 3, wherein the tensioning element includes a spiral spring which is one of inside and outside connected fixedly with the wall of the supply line so that the spiral spring experiences the same change in length as the supply line and generates the corresponding axial restoring force.

8. Robot according to claim 3, wherein the tensioning element includes spring elements which are located on at least one of the inside and the outside with regard to the supply line.

9. Robot according to claim 1, wherein the supply line substantially runs in a hose guide plane.

10. Robot according to claim 1, further comprising:
    a first robot element that is stationary or movable on a travel rail,
    a second robot element which is attached rotatably to the first robot element,
    a third robot element in the form of a robot arm which is attached pivotably to the second robot element,
    a fourth robot element in the form of a robot arm which is attached pivotably to the third robot element,
    a robot wrist which is attached to the fourth robot element, and
    a tool, which is attached to the robot wrist.

11. Robot according to claim 10, wherein the tool is an atomizer.

12. Robot according to claim 10, wherein
    a) the rotary axis of the second robot element is substantially vertically aligned,
    b) the third robot element and the fourth robot element have parallel pivot axes,
    c) the pivot axes of the third robot element and the fourth robot element are substantially horizontally aligned.

13. Robot according to claim 10, wherein the supply line is movable axially in at least one of the second robot element, the third robot element, a rotating joint between the first robot element and the second robot element, a pivoting joint between the second robot element and the third robot element, and a pivoting joint between the third robot element and the fourth robot element.

14. Robot according to claim 10, wherein
 a) the third robot element has an outer contour, and
 b) the supply line independently of the robot position in the pivot plane of the third robot element does not project over the outer contour of the third robot element, and
 c) the tensioning element applies such a large axial restoring force to the supply line that the supply line is maintained in a smooth state independently of the robot position, so that the supply line lies within the outer contour of the third robot element with regard to the pivot plane.

15. Robot according to claim 10, wherein the supply line runs between the second robot element and the fourth robot element laterally beside the third robot element with regard to the pivot plane.

16. Robot according to claim 10, wherein
 a) the supply line runs outside the third robot element,
 b) the supply line runs inside the fourth robot element,
 c) the supply line runs inside the second robot element, and
 d) the supply line runs at least partially inside the first robot element.

17. Robot according to claim 1, wherein
 a) the supply line is pigable up to and into the distal robot element, and
 b) the supply line comprises a hose package which includes a plurality of hose lines.

18. Robot according to claim 1, wherein the supply line guides or contains at least one of:
 a) a driving air for a rotary atomizer,
 b) a coating material,
 c) a solvent for the coating material,
 d) a pulsed air,
 e) a high voltage for an electrostatic coating operation,
 f) an electrical signaling line, and
 g) an optical wave guide.

19. Robot according to claim 10, further comprising a colour changer installed on the fourth robot element.

20. Robot according to claim 10, further comprising a colour changer installed in the fourth robot element.

21. A coating plant for coating motor vehicle body components comprising a robot according to claim 1.

* * * * *